I. JAYNE.
DIFFERENTIAL.
APPLICATION FILED MAY 28, 1919.
1,361,731.
Patented Dec. 7, 1920.
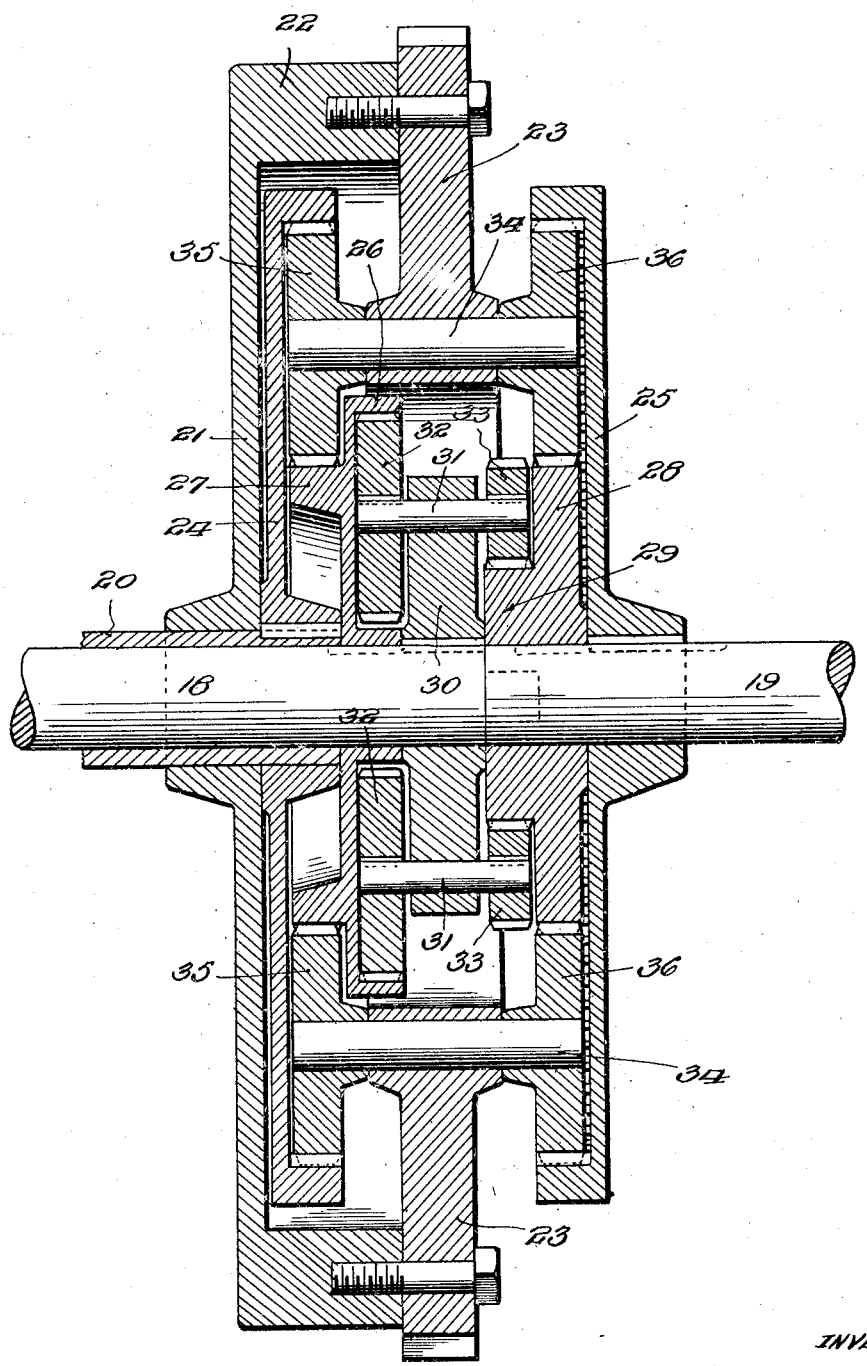
INVENTOR
I. Jayne.
by Lacey & Lacey
Attys.

UNITED STATES PATENT OFFICE.

IRVING JAYNE, OF EDWALL, WASHINGTON.

DIFFERENTIAL.

1,361,731.

Specification of Letters Patent. Patented Dec. 7, 1920.

Application filed May 28, 1919. Serial No. 300,331.

*To all whom it may concern:*

Be it known that I, IRVING JAYNE, citizen of the United States, residing at Edwall, in the county of Lincoln and State of Washington, have invented certain new and useful Improvements in Differentials, of which the following is a specification.

This invention relates to an improved differential for motor vehicles and has as one of its principal objects to provide a construction wherein spur gears will be employed so as to thus eliminate the end thrust incident to the use of the usual bevel gears.

The invention has as a further object to provide a construction wherein an equal division of power between the drive wheels of the vehicle may be had so that said wheels will exert an equal tractive effort but wherein, with slight modification, an unequal division of power may be had.

And the invention has as a still further object to provide a differential which will be compact and which may be readily employed upon substantially any conventional type of motor vehicle.

Other and incidental objects will appear hereinafter.

The figure of the drawing is a sectional view of my improved differential.

The differential is particularly designed for use in connection with a three wheel drive. Independently rotatable shaft sections 18 and 19 are employed and rotatable upon the section 18 is a tubular shaft 20. Freely mounted on the shaft 20 is a wheel or disk 21 provided at its periphery with a laterally directed flange 22 to which is bolted or otherwise secured a gear ring 23, this gear providing the driving gear of the differential. In this connection it is to be observed that the ring is formed with spur teeth. Fixed to the inner end of the shaft 20 is an internal gear 24. A similar gear 25 is fixed to the shaft section 19. Loosely mounted on the shaft section 18 is a compound gear comprising an internal gear 26 and an external gear 27. Loosely mounted on the inner end of the shaft section 19 is a second compound gear comprising a gear 28 and a gear 29, both external. Fixed to the inner end of the shaft section 18 is a disk 30 and journaled through this disk at equally spaced points from the axis thereof are cross shafts 31. Connected to corresponding ends of these shafts are differential pinions 32 while the opposite corresponding ends of said shafts carry differential pinions 33. The pinions 32 mesh with the internal gear 26 of one of the compound gears while the pinions 33 mesh with the gear 29 of the other of the compound gears. Journaled through the gear ring 23 at diametric points thereon and at points equally spaced from the axis of the shaft sections 18 and 19 are cross shafts 34. Loosely mounted upon corresponding ends of these shafts are differential pinions 35 while similar pinions 36 are loosely mounted upon opposite corresponding ends of said shafts. The pinions 35 mesh with the gear 24 and with the external gear 27 of the compound gear upon the shaft section 18. The pinions 36 mesh with the gear 25 and with the gear 28 of the compound gear upon the shaft section 19.

It is now to be observed that the gears 24 and 25 are of equal diameter. The external gear 27 and the gear 28 of the compound gears are also of equal diameter. This is also true of the differential pinions 35 and 36. On the other hand, the differential pinions 32 are twice the diameter of the pinions 33 and the diameter of the gear 29 and either one of the pinions 33 is equal to the diameter of the gear 27. Further, it will be noted that the diameter of the gear 26 is twice the diameter of the gear 29. Thus, the gears 26 and 29 correspond to the gears 13 and 14 of the preferred construction while the pinions 32 and 33 correspond to the pinions 16 and 17.

In view of the previous description, it is believed that the operation of the modified form of differential will be readily understood. However, it may be observed that the power will be distributed equally between the shaft sections 18 and 19 and the shaft 20. The inequality of the leverage exerted by the gears 24 and 25 as compared with the leverage exerted on the gears 27 and 28, is counterbalanced by the fact that the leverage on the gears 27 and 28 is united upon the disk 30.

Having thus described the invention, what is claimed as new is:

1. A differential including independently rotatable shaft sections, a tubular shaft rotatable upon one of said sections, gears fixed to the tubular shaft and the other to one of said shaft sections, an element fixed to the other of the shaft sections, compound gears loose on the shaft sections, a driving gear, coupled differential pinions carried by the driving gear and coacting each with one of said first mentioned gears as well as with one of said compound gears, and coupled differential pinions carried by said element and coacting one with each of the compound gears whereby the shaft sections and the tubular shaft will all be coupled with the driving gear.

2. A differential including independently rotatable shaft sections, a driving gear supported thereby, a tubular shaft rotatable upon one of said sections, spur gears fixed one to the tubular shaft and the other to one of said shaft sections, compound gears loose on the shaft sections, an element fixed to the other of said shaft sections, coupled spur gear differential pinions carried by the driving gear and coacting each with one of said first mentioned gears as well as with one of said compound gears, and coupled spur gear differential pinions carried by said element and coacting one with each of the compound gears whereby the shaft sections and the tubular shaft will all be coupled with the driving gear.

3. A differential including independently rotatable shaft sections, a tubular shaft rotatable upon one of said sections, a driving gear, differential pinions carried thereby, gears fixed one to one of said shaft sections and the other to the tubular shaft to coact with said pinions respectively, and a differential gear connection between said pinions and the other of said shaft sections.

4. A differential including independently rotatable shaft sections, a tubular shaft rotatable upon one of said sections, a driving gear, differential pinions carried thereby, gears fixed one to one of said shaft sections and the other to the tubular shaft to coact with said pinions respectively, and a gear connection between said pinions and the other of said shaft sections including compound gears engaged each by one of said pinions respectively, and differential pinions mounted to revolve with the latter shaft section and coacting with said compound gears.

5. A differential including independently rotatable shafts, gears fixed to two of said shafts, differential pinions mounted to revolve with another of said shafts, a driving gear, differential pinions mounted to revolve with the driving gear and coacting each with one of the first gears respectively, and a gear connection between the differential pinions of the driving gear and said first mentioned differential pinions.

In testimony whereof I affix my signature.

IRVING JAYNE. [L. S.]